(12) United States Patent
Kaminade et al.

(10) Patent No.: US 10,793,147 B2
(45) Date of Patent: Oct. 6, 2020

(54) VEHICLE SURROUNDING MONITORING DEVICE

(71) Applicants: TOYOTA JIDOSHA KABUSHIKI KAISHA, Toyota-shi, Aichi (JP); Continental Automotive GmbH, Hanover (DE)

(72) Inventors: Takuya Kaminade, Okazaki (JP); Koji Takeuchi, Toyota (JP); Atsushi Kido, Yokohama (JP)

(73) Assignees: TOYOTA JIDOSHA KABUSHIKI KAISHA, Toyota-shi, Aichi-ken (JP); Continental Automotive GmbH, Hanover (DE)

( * ) Notice: Subject to any disclaimer, the term of this patent is extended or adjusted under 35 U.S.C. 154(b) by 74 days.

(21) Appl. No.: 16/134,285

(22) Filed: Sep. 18, 2018

(65) Prior Publication Data
US 2019/0084558 A1    Mar. 21, 2019

(30) Foreign Application Priority Data

Sep. 19, 2017   (JP) .................. 2017-178512

(51) Int. Cl.
| | | |
|---|---|---|
| *B60W 30/09* | (2012.01) | |
| *B60Q 9/00* | (2006.01) | |
| *G08G 1/16* | (2006.01) | |

(52) U.S. Cl.
CPC ............ *B60W 30/09* (2013.01); *B60Q 9/008* (2013.01); *G08G 1/166* (2013.01); *B60W 2554/00* (2020.02)

(58) Field of Classification Search
CPC .. B60W 30/09; B60W 2550/10; B60W 30/08; B60Q 9/008; G08G 1/166; B60T 7/22; B60T 8/17558; B60R 21/0134; B60K 31/0008; B62D 15/0265; G01S 13/862
See application file for complete search history.

(56) References Cited

U.S. PATENT DOCUMENTS

| | | | | |
|---|---|---|---|---|
| 2004/0193374 A1* | 9/2004 | Hac | ..................... | B60K 31/0008 701/301 |
| 2012/0116663 A1* | 5/2012 | Tsunekawa | ............... | B60T 7/22 701/300 |

FOREIGN PATENT DOCUMENTS

JP        2009-146029 A       7/2009

* cited by examiner

*Primary Examiner* — Anne Marie Antonucci
*Assistant Examiner* — Andrew J Cromer
(74) *Attorney, Agent, or Firm* — Sughrue Mion, PLLC

(57) ABSTRACT

A radar ECU 13 gives priorities based on predicted collision times TTC and priorities based on relative distances D to all moving objects (S13), and selects 4 (four) moving objects in ascending order of the predicted collision times TTC (S14). The radar ECU 13 selects 5 (five) in ascending order of the relative distances D among the moving objects other than the moving object selected at S14 (S15). The radar ECU 13 transmits object information on the moving objects selected at S13 and S14 to a driving support ECU 20 (S16). The driving support ECU 20 performs various driving support controls based on the transmitted object information.

5 Claims, 9 Drawing Sheets

| PRIORITY | MONITORING TARGET MOVING OBJECT ID |
|---|---|
| 1 | ID1 |
| 2 | ID2 |
| 3 | ID3 |
| 4 | ID4 |
| 5 | ID5 |
| 6 | ID6 |
| 7 | ID7 |
| 8 | |
| 9 | |

IN ORDER OF SHORTEST TTC (MOVING OBJECT APPROACHING OWN VEHICLE)

IN ORDER OF SHORTEST RELATIVE DISTANCE (MOVING OBJECT CLOSE TO OWN VEHICLE)

M

VEHICLE SURROUNDING MONITORING DEVICE

BACKGROUND

Technical Field

The present disclosure relates to a vehicle surrounding monitoring device for monitoring around an own vehicle.

Related Art

Hitherto, as proposed in Japanese Patent Application Laid-open No. 2009-146029, there has been known a safety traveling device configured to detect an other vehicle which is present around an own vehicle using a radar and the like, and to alert a driver when the own vehicle has a probability of colliding with the other vehicle.

The device calculates a predicted collision time TTC (time to collision) which it takes for the own vehicle to collide with the other vehicle. The device alerts the driver when the predicted collision time TTC is shorter than a threshold.

SUMMARY

The above described device alerts the driver based on only the predicted collision time TTC. The above described device does not monitor an other vehicle which moves in a direction away from the own vehicle. When a plurality of other vehicles are traveling/moving around the own vehicle, the above described device monitors only the other vehicles which are approaching the own vehicle.

There has been known a driving support system configured to perform not only a safety driving support control for preventing a collision accident but also an driving support/assist control for facilitating a driving operation of the driver. For example, a lane change support control has been known as the operation driving support control. The lane change support control is a control for controlling steering of the own vehicle in such a manner that the own vehicle changes lanes from a present lane in which the own vehicle is traveling to an adjacent lane which is adjacent to the present lane so as to support a steering operation of the own vehicle when a lane change request is detected. When the driving support system performs the lane change support control, the driving support system needs to recognize an other vehicle which is traveling in the adjacent lane. In performing the lane change support control, the driving support system needs to monitor the other vehicle which is located near the own vehicle, even if that other vehicle is traveling in the direction away from the own vehicle (moving away), in order to secure an appropriate distance between the own vehicle and the other vehicle.

As described above, properties (for example, a relative traveling/moving direction of a monitoring target vehicle (vehicle to be monitored) with respect to the own vehicle, a relative distance between the monitoring target vehicle and the own vehicle, and the like) of the monitoring target vehicle are various depending on a support purpose of the driving support system.

A vehicle surrounding monitoring device selects a monitoring target object (object to be monitored) among objects detected by a surrounding sensor(s) (e.g., radar(s)), and generate/produce information on the selected monitoring target object (hereinafter, referred to as "object information"). The vehicle surrounding monitoring device transmits the generated object information via a communication line to a control device (hereinafter, referred to as a "driving support ECU") of the driving support system. However, if the vehicle surrounding monitoring device is configured to provide the object information corresponding to each of driving support control types, a large capacity of a memory of the vehicle surrounding monitoring device in which the object information is stored is required, and a communication load for transmitting the object information becomes excessive, when the properties of the monitoring target objects are different among the driving support controls. Meanwhile, a memory resource and a communication resource which are used to generate the object information and to transmit the generated object information are limited.

If the driving support controls are switched in response to an own vehicle behavior or an operation signal, the memory in which the object information is stored can be shared (or be commonly used) among the driving support controls. However, the driving support controls which are performed in a common scene cannot be switched in response to the own vehicle behavior and the operation signal. For example, it is considered that the driving support system performs both the safety driving support control and the operation driving support control at the same time. The other vehicle which approaches the own vehicle is monitored in the safety driving support control, and the other vehicle with the relatively short distance from the own vehicle is monitored in the operation driving support control. In this case, the vehicle surrounding monitoring device may not have a sufficiently large memory capacity to store both of the object information required by the safety driving support control and the object information required by the operation driving support device separately. In addition, the communication load may become excessive, because a total communication load of the object information is too high.

If sufficiently high specifications for the vehicle surrounding monitoring device and for the communication system are adopted, the above described problems may be able to be solved. However, adopting the high specifications may lead to a great increase in cost.

The present disclosure has been made to cope with the problem described above. The present invention has an object to provide the vehicle surrounding monitoring device which can provide appropriate object information without increasing the cost of the device.

The vehicle surrounding monitoring device (10) according to the present disclosure provides surrounding monitoring information to a driving support control means (20) for performing a safety driving support control and an operation driving support control, the vehicle surrounding monitoring device being installed in a driving support system (1) including the driving support control means, the safety driving support control being a control for alerting a driver when a probability of collision between an own vehicle and a moving object which is relatively approaching the own vehicle becomes high, the operation driving support control being a control for supporting an operation for making the own vehicle move in a lateral direction.

The vehicle surrounding monitor device comprises:

moving object detecting means (12, 13, S11) for detecting moving objects which are moving around the own vehicle;

first selecting means (S14) for selecting, among the moving objects detected by the moving object detecting means, a predetermined first number of the moving objects in ascending order of a predicted collision time (TTC) of each of the moving objects, the predicted collision time indicative of a predicted time which it takes for the moving object to collide with the own vehicle;

a second selecting means (S15) for selecting, among the moving objects detected by the moving object detecting means other than the moving objects selected by the first selecting means, a predetermined second number of the moving objects in ascending order of a relative distance (D) of each of the moving objects between the moving object and the own vehicle; and information providing means (S16) for providing information on the moving objects selected by the first selection means and the moving objects selected by the second selection means as the surrounding monitoring information to the driving support control means.

In some embodiments, the predicted collision time (TTC) is set to a time corresponding to a value obtained through dividing the relative distance (D) between the moving object and the own vehicle by a relative velocity (Vr) of the moving object with respect to the own vehicle.

The vehicle surrounding monitoring device is installed in the driving support system including the driving support control means, and provides the surrounding monitoring information to the driving support control means. The driving support means performs the safety driving support control and the operation driving support control. The safety driving support control is a control for alerting the driver when the probability of the collision between the own vehicle and the moving object which is approaching the own vehicle becomes high. The operation driving support control is a control for supporting the operation for making the own vehicle move in the lateral direction.

The vehicle surrounding monitoring device needs to provide the information on the moving object which is approaching the own vehicle to the driving support control means when the driving support control means performs the safety driving support control. Meanwhile, the vehicle surrounding monitoring device needs to provide, to the driving support control means, the information on the moving object which is present at a location close to the own vehicle when the driving support control means performs the operation driving support control. The information on the moving object includes information representing a relative location of the moving object with respect to the own vehicle and information representing a relative velocity of the moving object with respect to the own vehicle.

In view of the above, the vehicle surrounding monitoring device comprises the moving object detecting means, the first selecting means, and the second selecting means. The moving object detecting means detects the moving objects which are moving around the own vehicle. In other words, the moving object detecting means detects the moving objects which are objects other than stationary objects among the objects which are present around the own vehicle. For example, the moving objects are other vehicles which are traveling.

The first selecting means selects, among the moving objects detected by the moving object detecting means, the predetermined first number of the moving objects which are approaching the own vehicle in ascending order of the predicted collision time of the moving objects, the predicted collision time indicative of the predicted time which it takes for the moving object to collide with the own vehicle. Therefore, the first selecting means can select the moving objects which are necessary for the driving support control means to perform the safety driving support control. In some embodiments, the predicted collision time is a time period corresponding to a value obtained through dividing the relative distance between the own vehicle and the moving object by the relative velocity of the moving object with respect to the own vehicle. This predicted collision time is calculated easily. When the number of the moving objects which are approaching the own vehicle is smaller than the predetermined first number, the first selecting means selects all of the moving objects which are approaching the own vehicle.

The second selecting means selects, among the moving objects detected by the moving object detecting means other than the moving objects selected by the first selecting means, the predetermined second number of the moving objects in ascending order of a relative distance of each of the moving objects between the moving object and the own vehicle. Therefore, the second selecting means can select the moving objects which are necessary for the driving support control means to perform the operation driving support control. When the number of the moving objects other than the moving objects selected by the first selecting means is smaller than the predetermined second number, the second selecting means selects all of the moving objects other than the moving objects selected by the first selecting means.

The information providing means provides the information on the moving objects selected by the first selection means and the moving objects selected by the second selection means as the surrounding monitoring information to the driving support control means. Therefore, the information providing means can provide, to the driving support means, the information on the moving object which is useful for the safety driving support control and the information on the moving object which is useful for the operation driving support control. The information providing means can provide the appropriate surrounding monitoring information in accordance with a situation where the moving object selected by the first selecting means and the second selecting means are changed every moment.

As a result, the vehicle surrounding monitoring device according to the present disclosure can provide the appropriate surrounding monitoring information without increasing the cost of the device. The driving support system can perform the driving support control appropriately without increasing the cost of the system.

One embodiment of the present disclosure resides in that the vehicle surrounding monitoring device is installed in the driving support system including the driving support control means, wherein the driving support control means is configured to:

perform an approaching alert control for alerting the driver when the probability of the collision between the own vehicle and the moving object which is approaching a traveling path of the own vehicle in such a manner that the moving object crosses the traveling path becomes high, as the safety driving support control; and perform a lane change support control for controlling steering in such a manner that the own vehicle changes lanes from a present lane in which the own vehicle is traveling to an adjacent lane which is adjacent to the present lane, as the operation driving support control.

The vehicle surrounding monitoring device is installed in the driving support system including the driving support control means. The driving support control means performs the approaching alert control for alerting the driver when the probability of the collision between the own vehicle and the moving object which is approaching a traveling path of the own vehicle in such a manner that the moving object crosses the traveling path becomes high, as the safety driving support control. Therefore, the first selecting means can select the moving objects which are necessary for the driving support control means to perform the approaching alert control.

The driving support control means performs the lane change support control for controlling steering in such a manner that the own vehicle changes lanes from the present lane in which the own vehicle is traveling to the adjacent lane which is adjacent to the present lane, as the operation driving support control. When the driving support control means performs the lane change support control, the driving support control means needs a location of the other vehicle which is traveling in the adjacent lane. In other words, the driving support control means needs to recognize that an enough (sufficiently large) space to allow the own vehicle to move to the adjacent lane is secured. In this case, the relative distance between the own vehicle and the other vehicle which is traveling in the adjacent lane is important. Therefore, the second selecting means can select the moving objects which are necessary for the driving support control means to perform the lane change support control.

Therefore, the driving support system can perform the approaching alert control and the lane change support control appropriately without increasing the cost of the system. In some embodiments, the driving support control means performs not only the above described approaching alert control and the above described lane change support control but also support controls other than those.

One embodiment of the present disclosure resides in that the first selecting means is configured to give a higher priority for the selection to the moving object with a shorter relative distance among the moving objects with the same predicted collision times.

The first selecting means selects the predetermined first number of the moving objects in ascending order of the predicted collision time. However, when the first selecting means selects all of the moving objects with the same predicted collision times, the number of the selected moving objects may be greater than the predetermined first number. In view of the above, the first selecting means gives a higher priority for the selection to the moving object with the shorter relative distance (i.e., preferentially selects the moving object having the shorter relative distance) among the moving objects with the same predicted collision times. Therefore, the first selecting means according to this embodiment can select more appropriate moving objects.

One embodiment of the present disclosure resides in that the second selecting means is configured to give a higher priority for the selection to the moving object with a shorter predicted time among the moving objects with the same relative distance.

The second selecting means selects the predetermined second number of the moving objects in ascending order of the relative distance. However, when the second selecting means selects all of the moving objects with the same relative distances, the number of the selected moving objects may be greater than the predetermined second number. In view of the above, the second selecting means gives a higher priority for the selection to the moving object with the shorter predicted time period (i.e., preferentially selects the moving object having the shorter predicted time period) among the moving objects with the same relative distance. Therefore, the second selecting means according to this embodiment can select more appropriate moving objects.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols.

DETAIL DESCRIPTION

A vehicle surrounding monitoring device according to an embodiment of the present disclosure will next be described with reference to the accompanying drawings.

Figure 1:
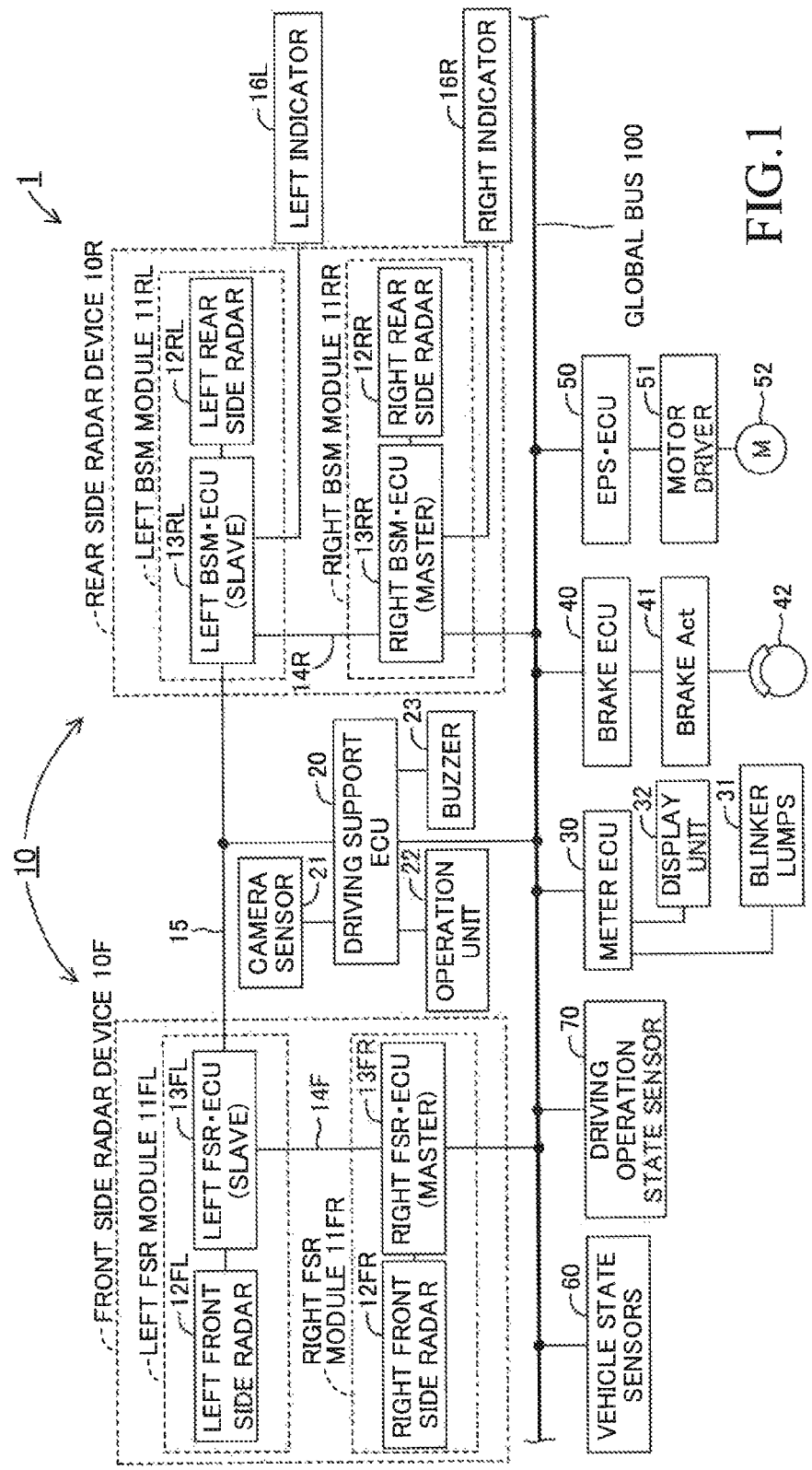
FIG. 1 is a schematic system configuration diagram of a driving support control system including a vehicle surrounding monitoring device according to an embodiment.

A schematic configuration of a driving support system 1 comprising a vehicle surrounding monitoring device 10 according to the embodiment of the present disclosure is shown in FIG. 1. The driving support system 1 is installed in a vehicle. Hereinafter, this vehicle may be referred to as an "own vehicle", when this vehicle needs to be distinguished from other vehicles.

The driving support system 1 comprises the vehicle surrounding monitoring device 10, a driving support ECU 20, a meter ECU 30, a brake ECU 40, an electronic power steering ECU 50.

Each ECU is an "Electronic Control Unit" which includes a microcomputer as a main part. The ECU is connected to each other via a global bus 100 so as to transmit/receive information to/from each other. The global bus 100 is a communication line of CAN (Controller Area Network). The microcomputer includes a CPU, a ROM, a RAM, a no-volatile memory, an interface I/F, and the like. The CPU achieves various functions by executing instructions (program, routine) stored in the ROM. Some or all of these ECUs may be integrated into a single ECU.

The global bus 100 is connected to various types of vehicle state sensors 60 for detecting vehicle states, and various types of driving operation state sensors 70 for detecting driving operation states of the driver. The vehicle state sensors 60 and the driving operation state sensors 70 are also components of the driving support system 1. For example, the vehicle state sensors 60 include vehicle velocity/speed sensor for detecting a traveling velocity of the own vehicle, wheel velocity sensors for detecting a wheel velocity of each of wheels, a front-rear G sensor for detecting an acceleration in a front-rear direction of the own vehicle, a left-right G sensor for detecting an acceleration in a left-right direction of the own vehicle, and a yaw rate sensor for detecting a yaw rate of the own vehicle.

The driving operation state sensors 70 include an accelerator operation amount sensor for detecting an operation amount of an accelerator pedal, a brake operation amount sensor for detecting an operation amount of a brake pedal, a brake switch for detecting whether or not the brake pedal is operated, a steering angle sensor for detecting a steering angle, a turn signal operation sensor for detecting an operation of a turn signal lever, and a shift position sensor for detecting a shift position of a transmission.

Information detected by the vehicle state sensors 60 and information detected by the driving operation state sensor 70 (hereinafter, these information are referred to as "sensor information") are transmitted to the global bus 100. Each ECU can use the sensor information transmitted to the global bus 100. In some embodiments, a specific ECU transmits, to the global bus 100, the sensor information sent from a sensor connected to the specific ECU.

The vehicle surrounding monitoring device 10 detects one or more objects which are present around the own vehicle and provides information on the detected objects to the driving support ECU 20.

The vehicle surrounding monitoring device 10 comprises a front side radar device 10F for detecting one or more objects which are present in a front side area of the own vehicle, and a rear side radar device 10 R for detecting one or more object which are present in a rear side area of the own vehicle. The front side radar sensor 10F includes a right front side radar module 11FR and a left front side radar module 11FR. The right front side radar module 11FR is referred to as a "right FSR module 11FR", and the left front side radar module 11RR is referred to as a "left FSR module 11FL". The FSR is an abbreviation of Front Side Radar.

The rear side radar sensor 10R includes a right rear side radar module 11RR and a left rear side radar module 11RL. The right rear side radar module 11RR is referred to as a "right BSM module 11RR", and the left rear side radar module 11RL is referred to as a "left BSM module 11RL". The BSR is an abbreviation of Blind Spot Monitoring.

Figure 2:
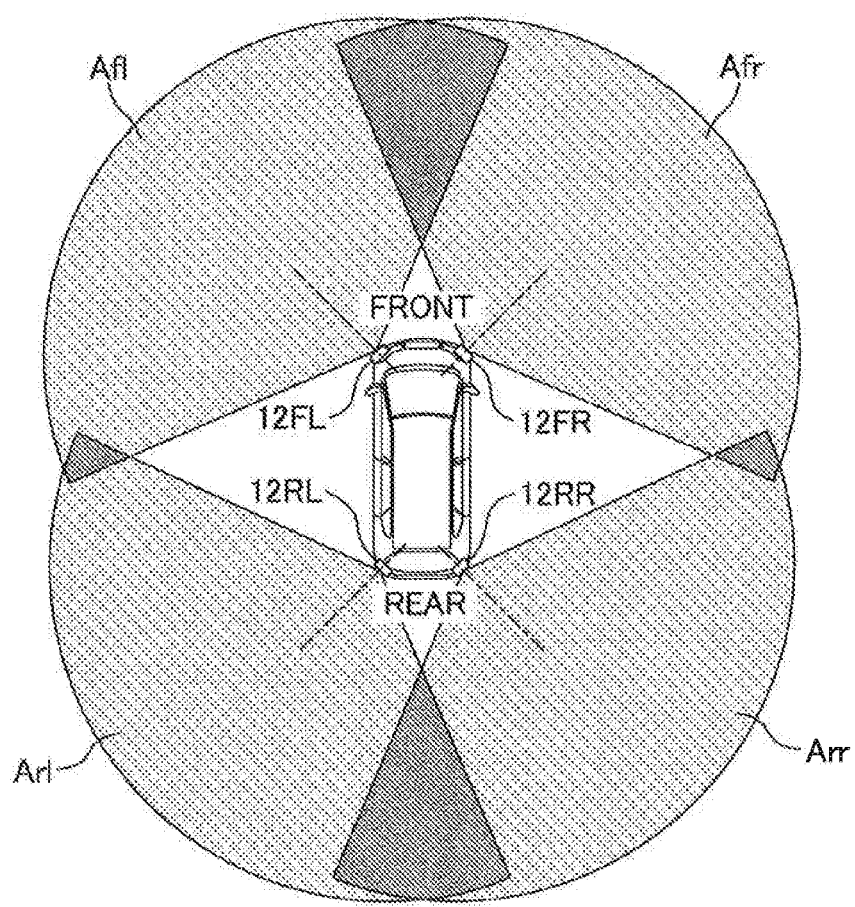
FIG. 2 is a plane diagram illustrating arranged locations and detection angel ranges of 4 (four) radars.

The right FSR module 11FR includes a right front side radar 12FR and a right FSR ECU 13FR connected to the right front side radar 12FR. The left FSR module 11FL includes a left front side radar 12FL and a left FSR ECU 13FL connected to the left front side radar 12FL. As shown in FIG. 2, the right front side radar 12FR is attached at (fixed to) a right front corner of a vehicle body (for example, a front bumper), and the left front side radar 12FL is attached at (fixed to) a left front corner of the vehicle body (for example, the front bumper). In the present embodiment, the right FSR ECU 13FR is integrated with the right front side radar 12FR, however, in some embodiments, the right FSR ECU 13FR is provided separately from the right front side radar 12FR. In the present embodiment, the left FSR ECU 13FL is integrated with the left front side radar 12FL, however, in some embodiments, the left FSR ECU 13FL is provided separately from the left front side radar 12FL.

As shown in FIG. 2, the right front side radar 12FR transmits/emits radio waves to a detection area Afr, and receives reflected waves of the transmitted waves so as to detect an object(s) present in the detection area Afr based on the reflected waves. For example, the detection area Afr has an angle range of ±75 degrees from a center axis which extends in a right front direction from the right front corner of the vehicle body. The left front side radar 12FL transmits/emits radio waves to a detection area Afl, and receives reflected waves of the transmitted waves so as to detect an object(s) present in the detection area Afl based on the reflected waves. For example, the detection area Afl has an angle range of ±75 degrees from a center axis which extends in a left front direction from the left front corner of the vehicle body. The detection area Afr of the right front side radar 12FR and the detection area Afl of the left front side radar 12 FL are left-right symmetrical about a symmetrical axis which is a front-rear axis of the own vehicle (front-rear axis passing through a center in a width direction of the vehicle). The detection area Afr of the right front side radar 12FR and the detection area Afl of the left front side radar 12 FL overlap in a front center area of the own vehicle. The overlapping area is painted in gray in FIG. 2.

As shown in FIG. 1, the right BSM module 11RR includes a right rear side radar 12RR and a right BSM ECU 13RR connected to the right rear side radar 12RR. The left BSM module 11RL includes a left rear side radar 12RL and a left BSM ECU 13RL connected to the left rear side radar 12RL. As shown in FIG. 2, the right rear side radar 12RR is attached at (fixed to) a right rear corner of the vehicle body (for example, a rear bumper), and the left rear side radar 12RL is attached at (fixed to) a left rear corner of the vehicle body (for example, the rear bumper). In the present embodiment, the right BSM ECU 13RR is integrated with the right rear side radar 12RR, however, in some embodiments, the right BSM ECU 13RR is provided separately from the right rear side radar 12RR. In the present embodiment, the left BSM ECU 13RL is integrated with the left rear side radar 12RL, however, in some embodiments, the left BSM ECU 13RL is provided separately from the left rear side radar 12RL.

As shown in FIG. 2, the right rear side radar 12RR transmits/emits radio waves to a detection area Arr, and receives reflected waves of the transmitted waves so as to detect an object(s) present in the detection area Arr based on the reflected waves. For example, the detection area Arr has a range of ±75 degrees from a center axis which extends in a right rear direction from the right rear corner of the vehicle body. The left rear side radar 12RL transmits/emits radio waves to a detection area Arl, and receives reflected waves of the transmitted waves so as to detect an object(s) present in the detection area Arl based on the reflected waves. For example, the detection area Arl has a range of ±75 degrees from a center axis which extends in a left rear direction from the left rear corner of the vehicle body. The detection area Arr of the right rear side radar 12RR and the detection area Arl of the left rear side radar 12RL are left-right symmetrical about a symmetrical axis which is the front-rear axis of the own vehicle. The detection area Arl of the right rear side radar 12RL and the detection area Arr of the left rear side radar 12RR overlap in a rear center area of the own vehicle.

The detection area Afr of the right front side radar 12FR and the detection area Arr of the left rear side radar 12RR overlap in a right center area of the own vehicle. The detection area Afl of the left front side radar 12FL and the detection area Arl of the left rear side radar 12RL overlap in a left center area of the own vehicle. These overlapping areas are painted in gray in FIG. 2.

The detection angle range of each of the right front side radar 12FR, the left front side radar 12FL, the right rear side radar 12RR, the left rear side radar 12RL is shown in FIG. 2. However, a detection distance of each of the radars shown in FIG. 2 is for illustrative purposes only. The detection distance has been set to an appropriate distance (for example, tens of meters) according to the purpose of each of the radars.

Hereinafter, when the right front side radar 12FR, the left front side radar 12FL, the right rear side radar 12RR, and the left rear side radar 12RL do not need to be distinguished from each other, these radars are referred to as "radars 12". The right FSR ECU 13FR, the left FSR ECU 13FL, the right BSM ECU 13RR, and the left BSM ECU 13RL do not need to be distinguished from each other, these ECUs are referred to as "radar ECUs 13".

Each of the radars 12 detects a relative location (a relative distance and a relative direction) of the object in relation to itself (each of the radars 12), a relative velocity of the object in relation to itself (each of the radars 12), a size (a width) of the object, and the like, and transmits a signal indicative of the detection result. The signal includes a detection physical amount (for example, a reflected waves strength) of each of the radars 12. Hereinafter, the signal which is transmitted by each of the radars 12 is referred to as "object information". The right front side radar 12FR transmits the object information to the right FSR ECU 13FR. The left front side radar 12FL transmits the object information to the left FSR ECU 13FL. The right rear side radar 12RR transmits the object information to the right BSM ECU 13RR. The left rear side radar 12RL transmits the object information to the left BSM ECU 13RL.

The object information is information which directly represents the relative location, the relative velocity, the size of the object, and the like. In some embodiments, the object information is information from which the relative location, the relative velocity, the size of the object, and the like can be calculated.

The right FSR ECU 13FR and the left FSR ECU 13FL are connected to each other in a master-slave manner via a local bus 14F. In the present embodiment, the right FSR ECU 13FR is a master, and the left FSR ECU 13FL is a slave. The right FSR ECU 13FR which is the master is connected to the global bus 100.

The right BSM ECU 13RR and the left BSM ECU 13RL are connected to each other in a master-slave manner via a local bus 14R. In the present embodiment, the right BSM ECU 13RR is a master, and the left BSM ECU 13RL is a slave. The right BSM ECU 13RR which is the master is connected to the global bus 100.

The left FSR ECU 13FL (the slave) and the left BSM ECU 13RL (the slave) are connected to each other via the local bus 15. This local bus 15 is connected to the driving support ECU 20.

Each of the ECUs 13FR, 13FL, 13RR, 13RL performs an monitoring target selecting routine described later so as to select one or more of moving objects with/having high priority (for detection) among the detected object(s) and to provide information (hereinafter, referred to as "object information") on the selected moving object(s) to the driving support ECU 20.

In the driving support system 1, the right FSR ECU 13FR transmits the object information (on the selected moving object(s)) to the left FSR ECU 13FL. The left FSR ECU 13FL transmits (provides) the object information on the moving object(s) which have (has) been selected by itself and (together with) the object information transmitted from the right FSR ECU 13FR to the driving support ECU 20 via the local bus 15.

The right BSM ECU 13RR transmits the object information (on the selected moving object(s)) to the left BSM ECU 13RL. The left BSM ECU 13RL transmits (provides) the object information on the moving object(s) which have (has) been selected by itself and (together with) the object information transmitted from the right BSM ECU 13RR to the driving support ECU 20 via the local bus 15.

The driving support ECU 20 is a core device of the driving support system for supporting a driving operation of the driver, and corresponds to a driving support control means of the present disclosure. The driving support ECU 20 performs a front area cross alert control, a rear area cross alert control, and a lane change support control, based on the object information transmitted (provided) by/from the vehicle surrounding monitoring device 10.

The front area cross alert control is a driving support control for notifying the driver of presence of a moving object in order to prevent the driver from delaying in performing a driving operation for preventing a collision with that moving object, when the moving object is approaching a traveling path of the own vehicle in such a manner that the moving object crosses the traveling path in a front area of the own vehicle. The rear area cross alert control is a driving support control for notifying the driver of presence of a moving object in order to prevent the driver from delaying in performing a driving operation for preventing a collision with that moving object, when the moving object is approaching a traveling path of the own vehicle in such a manner that the moving object crosses the traveling path in a rear area of the own vehicle. The front area cross alert control and the rear area cross alert control relate to the safety driving support control.

The lane change support control is a control for controlling steering (steering angle) of the own vehicle automatically in such manner that own vehicle moves from a present lane in which the own vehicle is traveling to a lane (adjacent lane) which is adjacent to the present lane, so as to support a driving operation of the driver, when a lane change request is received. The lane change support control relates to the operation driving support control.

The front area cross alert control, the rear area cross control, and the lane change support control will be described later.

A camera sensor 21, an operation unit 22, and a buzzer 23 are connected to the driving support control ECU 20.

The camera sensor 21 includes a camera (not shown) and an image processing unit (not shown). The camera photographs the front area of the own vehicle so as to acquire image data of that area. The image processing unit extracts left and right white lines (lane markers) painted on a road, and calculates a "lateral direction location and a direction" of the own vehicle with respect to a lane which is defined by the left and right white lines, based on the image data acquired by the camera. The image processing unit calculates "a width and a curvature" of the lane. The camera sensor 21 provides information calculated by the image processing unit (hereinafter, referred to as "lane information") to the driving support ECU 20.

The operation unit 22 is an operation unit via which the driver sets whether or not each of the driving support controls is to be performed and various parameters. In the present embodiment, one operation unit 22 is connected to the driving support ECU 20. In some embodiments, a plurality of the operation units 22 are connected to the driving support ECU 20.

The buzzer 23 works to generate buzzer sound when the buzzer 23 receives a working instruction from the driving support ECU 20. The buzzer sound alerts the driver.

The meter ECU 30 is connected to left and right blinker lumps 31 and a display unit 32. The blinker lumps 31 are also referred to as turn signal lumps. The blinker lumps 31 are direction indicator lumps. When the left and right blinker lumps 31 is made to simultaneously flash intermittently, the blinker lumps 31 function as hazard lumps. Hereinafter, when the blinker lumps 31 are used as the hazard lumps, the blinker lumps 31 are referred to as the hazard lumps 31.

The meter ECU 30 comprises a blinker drive circuit (not shown). When the blinker drive circuit receives a blinker flashing instruction via the global bus 100, the blinker drive circuit makes some of the blinker lumps 31 corresponding to a direction (left or right) designated by the blinker flashing instruction flash intermittently. When the blinker drive circuit receives a hazard lumps flashing instruction, the blinker drive circuit makes all of the left and right blinker lumps 31 (the hazard lumps 31) flash intermittently and simultaneously.

The meter ECU 30 receives a detection signal from the blinker operation sensor for detecting an operation of a blinker lever, and make some of the blinker lumps 31 corresponding to an operation direction according to the operation of the blinker lever. The meter ECU 30 transmits, to the global bus 100, a blinker monitoring signal indicative of a flashing state of the blinker lumps 31 while the meter ECU 30 is making some or all of the blinker lumps 31 flash intermittently.

When the meter ECU 30 receives a display instruction via the global bus 100, the meter ECU 30 displays a display screen specified by the received display instruction on the display unit 32. For example, when the driving support ECU 20 detects an alert target object (an object which the driver should pay attention to) while the driving support ECU 20 is performing the front area cross alert control or the rear front area cross alert control, the driving support ECU 20 makes the buzzer 23 work, and transmits an attention display instruction to the meter ECU 30. The meter ECU 30 displays a display screen representing an attention content (for example, an attention direction (a left direction or a right direction)) included in the attention display instruction on the display unit 32.

For example, while the driving support ECU is performing the lane change support control, the driving support ECU 20 transmits, to the meter ECU 30, a lane change support state signal indicating that the lane change support control is being performed, and a blinker flashing instruction corresponding to a lane change direction. The meter ECU 30 displays a display screen indicating that the lane change support control is being performed on the display unit 32 based on the lane change support state signal, and intermittently flashes some of the blinker lumps 31 corresponding to the lane change direction based on the blinker flashing instruction.

The brake ECU 40 is connected to a brake actuator 41. The brake actuator 41 is provided in a hydraulic circuit between an "unillustrated master cylinder which pressurizes working oil by using a depressing force applied to a brake pedal" and a "friction brake mechanisms 42". The friction brake mechanisms 42 are provided in a left front wheel, a right front wheel, a left rear wheel, and a right rear wheel. Each of the friction brake mechanisms 42 includes a "brake disc which is fixed to the corresponding one wheel" and a "brake caliper which is fixed to the corresponding one wheel". The brake actuator 41 adjusts oil pressure applied to a wheel cylinder installed in the brake caliper based on an instruction from the brake ECU 40. The oil pressure makes the wheel cylinder work so as to press a brake pad to the brake disc. As a result, frictional braking force is generated. Therefore, the brake ECU 40 controls the brake actuator 41 so as to be able to control a braking force of the own vehicle.

For example, when the brake ECU 40 receives a brake pressure instruction via the global bus 100, the brake ECU 40 controls the brake actuator 41 so as to generate frictional braking force greater than frictional braking force which is generated when the brake pedal is operated normally. That is, the brake ECU 40 makes a "ratio of the frictional braking force to a depressing stroke of the brake pedal when the brake ECU 40 receives the brake pressure increasing instruction" greater than the "ratio when the brakes ECU 40 receives no brake pressure increasing instruction (at normal time)". Further, when the brake ECU 40 receives an automatic braking instruction via the global bus 100, the brake ECU 40 controls the brake actuator 41 to generate predetermined frictional force without a brake pedal operation.

The electric power steering ECU 50 is a controller of an electric power steering device. Hereinafter, the electric power steering ECU 50 is referred to as an "EPS ECU (Electric Power Steering ECU) 50". The EPS ECU 50 is connected to a motor driver 51. The motor driver 51 is connected to a steering motor 52. The steering motor 52 is installed in an unillustrated steering mechanism.

The EPS ECU 50 controls energization of the motor driver 51 in order to drive the steering motor 52 based on a steering torque detected by a steering torque sensor. The steering torque is applied to a steering handle (not shown) by the driver. The driving of the steering motor 52 gives the steering torque to the steering mechanism in order to assist a steering operation of the driver.

When the EPS ECU 50 receives a steering instruction from the driving support ECU 20 via the global bus 100, the EPS ECU 50 drives the steering motor 52 based on a control amount specified by the steering instruction to generate the steering torque. This steering torque is different from the above described steering assist torque for lightening the steering operation (a handle operation) of the driver. This steering torque is a torque which is given to the steering mechanism according to the steering instruction from the driving support ECU 20 even when the driver does not operate the steering handle.

Figure 3:
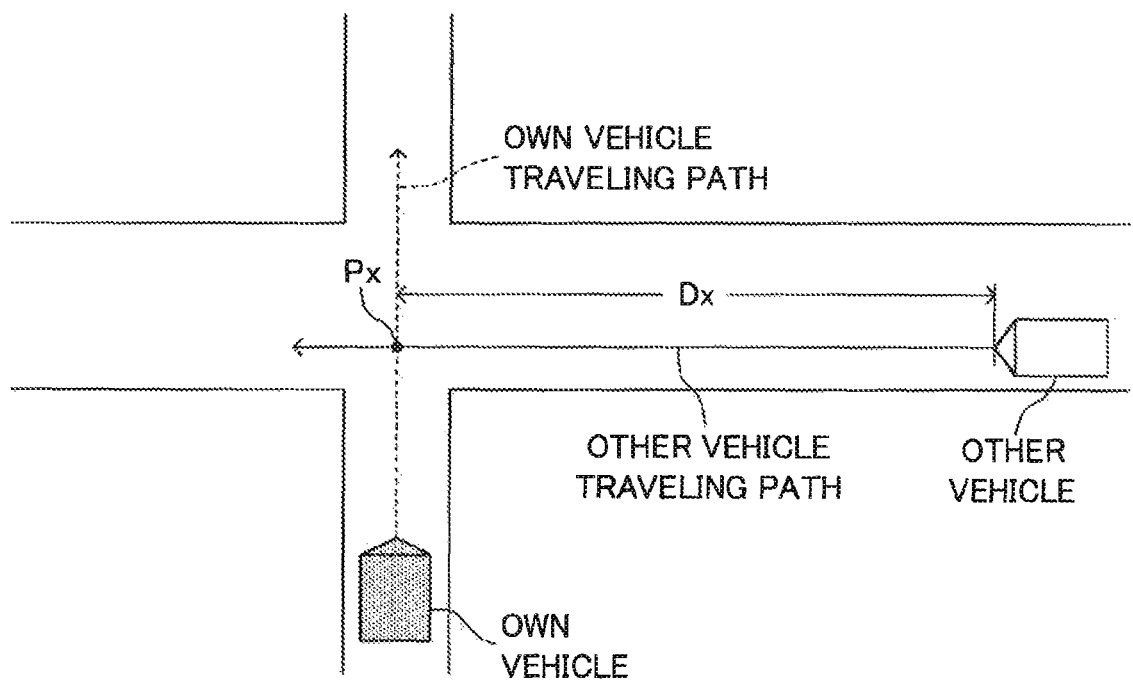
FIG. 3 is a side-view diagram illustrating a relative location relationship between an own vehicle and another vehicle in a front area cross alert control.

The driving support controls performed by the driving support ECU 20 will next be described in detail. First of all, the front area cross alert control which is one of the driving support controls is described. As shown in FIG. 3, the front area cross alert control is a control for alerting the driver when the own vehicle has a high probability of colliding with an other vehicle which is approaching the traveling path of the own vehicle in such a manner that the other vehicle crosses the traveling path in the front area of the own vehicle. In the present embodiment, a control for increasing the braking force according to the brake pedal operation of the driver is also performed in the situation where the driving support ECU 20 is alerting the driver.

The driving support ECU 20 extrapolates/predicts a traveling path of the own vehicle. The driving support ECU 20 repeatedly determines whether or not a cross target object is present based on the object information transmitted by the vehicle surrounding monitoring device 10 and own vehicle state information including the vehicle velocity, the acceleration, the yaw rate, the steering angle, and the like which are detected by the vehicle state sensors 60. The cross target object is the object which is present around the own vehicle and which is approaching the traveling path of the own vehicle in such a manner that the object crosses the traveling path in the front area of the own vehicle. The driving support ECU 20 calculates a traveling path of the cross target object, and acquires a location (a predicted cross location Px) at which the traveling path of the own vehicle and traveling path of the cross target object cross/intersect with each other. Thereafter, the driving support ECU 20 calculates a target object velocity Vx indicative of a traveling velocity of the cross target object at the present time point and a remaining distance Dx indicative of a distance between a location of the cross target object at the present time point and the predicted cross location Px.

The driving support ECU 20 calculates a remaining time period Tx indicative of a predicted time (time length) which it takes for the cross target object to reach the predicted cross location Px from the present time point. The remaining time period Tx is calculated under an assumption that the cross target object continues traveling at the traveling velocity at the present time point. Therefore, the remaining time period Tx is obtained through dividing the remaining distance Dx by the target velocity Vx (Tx=Dx/Vx).

The driving support ECU 20 determines whether or not the remaining time period Tx is equal to or shorter than a predetermined time threshold Tref. This time threshold Tref defines a timing at which the alert starts to be generated. The time threshold Tref has been set to a sufficient time period for which the driver can perform a collision preventing operation for preventing the own vehicle from colliding with the cross target object. When the remaining time period Tx is longer than the predetermined time threshold Tref, the driving support ECU 20 repeats the above described processes. Therefore, the driving support ECU 20 repeatedly determines whether or not the cross target object is present. Every time it is determined that the cross target object is present, the driving support ECU calculates the remaining time period Tx and compares the remaining time period Tx with the time threshold Tref.

When the remaining time period Tx becomes equal to or shorter than the time threshold Tref while those processes are being performed, the driving support ECU 20 makes the buzzer 23 work, and transmits the attention display instruction to the meter ECU 30. When the meter ECU 30 receives the attention display instruction, the meter ECU 30 displays the display screen representing the attention content (for example, the attention direction (a left direction or a right direction)) included in (specified by) the attention display instruction on the display unit 32. Therefore, the driver can recognize that the cross target object is approaching and perform the collision preventing operation if necessary. When a plurality of the cross target objects are present, the driving support ECU 20 performs the above described processes for each of the cross target objects. Accordingly, the driving support ECU 20 alerts the driver to the cross target object having the remaining time period Tx which becomes equal to or shorter than the time threshold Tref at the earliest timing among the cross target objects.

The driving support ECU 20 transmits the brake pressure increasing instruction to the brake ECU 40 at the timing at which the driving support ECU 20 transmits the attention display instruction. Therefore, when the driver presses down the brake pedal after the brake pressure increasing instruction is transmitted, "the frictional braking force greater than frictional braking force which is generated when the brake pedal is operated under a normal driving state" is generated so as to be able to support the brake operation of the driver.

The driving support ECU 20 regards the moving object which is approaching the own vehicle in the lateral direction as a monitoring target of the front area cross alert control. However, the driving support ECU 20 does not regard the "moving object which is not approaching the own vehicle in the lateral direction" as the monitoring target. The front area cross alert control is repeatedly performed while an ignition switch is in an on state.

The front area cross alert has been described thus far.

The rear area cross alert control is different from the front area cross alert control in the following point. In the rear area cross alert control, the driving support ECU 20 regards the "other vehicle which is approaching the traveling path in such a manner the other vehicle crosses the traveling path in the rear area of the own vehicle" as the monitoring target, while the own vehicle travels backwards. A description of the rear area cross alert control is omitted, because the rear area cross alert control is basically the same as the front area cross control except for the different point described above.

The lane change support control will next be described. The lane change support control is a control for controlling steering (in actuality, the steering angle) of the own vehicle automatically in such manner that own vehicle moves from the lane (hereinafter, referred to as an "original lane") in which the own vehicle is traveling to the adjacent lane (hereinafter, referred to as a "target lane") which is adjacent to the original lane, so as to support the driving operation of the driver. Therefore, according to the lane change support control, the own vehicle can change lanes without the steering operation (the handle operation) of the driver.

The lane change support control is a control of a lateral location of the own vehicle with respect to the lane. The lane change support control is performed when the lane change support request is accepted. The lane change request is generated when the driver performs a predetermined operation. The predetermined operation is an operation performed on an operation unit for the lane change support control or an already-existing operation unit (for example, the blinker lever). When the driving support ECU 20 receives a lane change support request signal, the driving support ECU 20 determines whether or not a lane change support start allowance condition is satisfied. When the lane change support start allowance condition is satisfied, the driving support ECU 20 starts the lane change support control. The lane change support request (signal) includes information indicative of a lane change direction (i.e., left or right).

The lane change support start allowance condition includes at least two of the following allowance condition.

1. The white line corresponding to the lane change direction (the white line which is a boundary between the original lane and the target lane) is a broken line.

2. The vehicle surrounding monitoring device determines that no obstacle (the other vehicle or the like) which obstructs the lane change is present. That is, it is determined that the lane change can be performed safely.

The driving support ECU 20 accepts the lane change support request when the lane change support start allowance condition including the above described allowance conditions 1 and 2 is satisfied, and starts the lane change support control.

The allowance condition 1 is a condition to have the own vehicle perform the legitimate lane change, because a lane change is prohibited when the boundary between the lanes is not the broken line. The driving support ECU 20 determines whether or not the allowance condition 1 is satisfied based on the lane information provided by the camera sensor 21.

Figure 4:
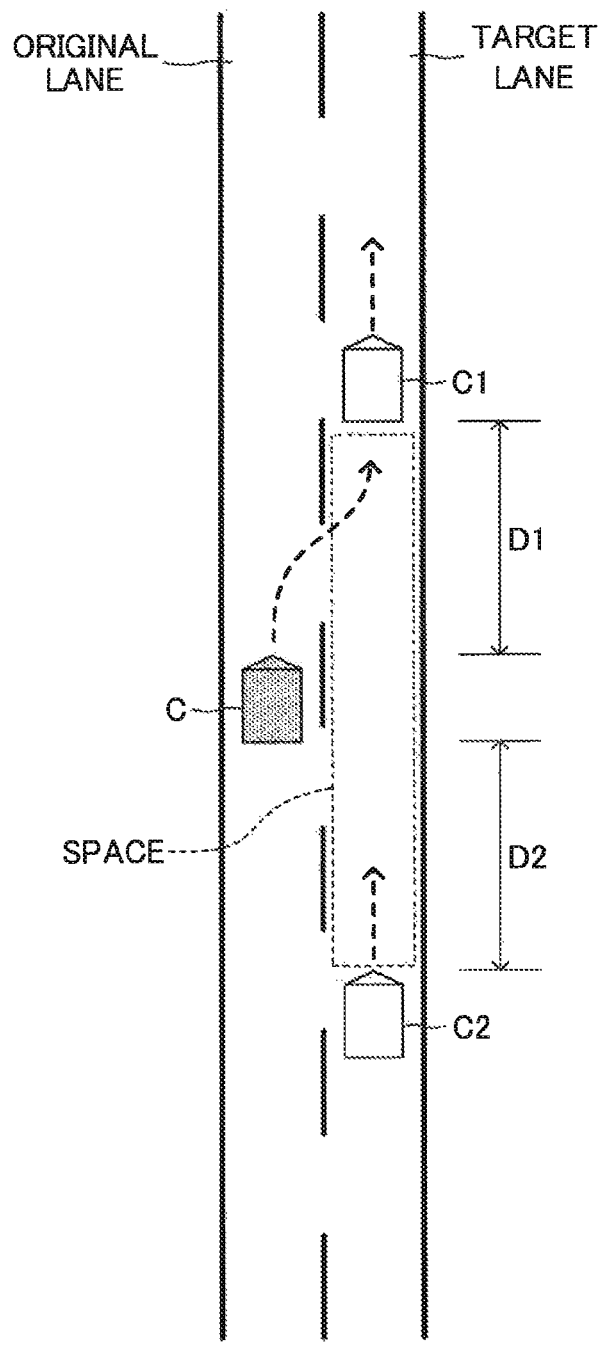
FIG. 4 is a plane diagram illustrating a relative location relationship between the own vehicle and the other vehicle in a lane change support control.

The allowance condition 2 will next be described. The driving support ECU 20 specifies the location of the moving object (the other vehicle) which is traveling in the target lane based on the lane information provided by the camera sensor 21 and the object information provided by the vehicle surrounding monitoring device 10. When the own vehicle changes lanes from the original lane to the target lane, a certain space is needed to be able to secure a sufficient/ appropriate distance between the own vehicle and the other vehicle which is traveling in the target lane. For example, as shown in FIG. 4, it is necessary to secure an appropriate distance for each of "the distance D1 between the own vehicle C and the other vehicle C1 which is traveling in the target lane in front of the own vehicle C" and "the distance D2 between the own vehicle C and the other vehicle C2 which is traveling in the target lane in the rear of the own vehicle C".

The driving support ECU 20 determines whether or not the distance between the own vehicle and the other vehicle which is traveling in the target lane is equal to or longer than a predetermined lane change allowance distance based on the object information provided by the vehicle surrounding monitoring device 10. When the distance is equal to or longer than the lane change allowance distance, the driving support ECU 20 determines that the allowance condition 2 is satisfied.

As described above, in performing the lane change support control, the driving support ECU 20 regards "the moving object which is traveling in a longitudinal direction of the own vehicle (i.e., in the same direction as a direction in which the own vehicle is traveling) and is present in a side of the own vehicle" as the monitoring target. Especially, the driving support ECU 20 needs to monitor the "moving object with a relatively short distance from the own vehicle" without fail.

When the lane change support start allowance condition is satisfied, the driving support ECU 20 starts the lane change support. In this case, the driving support ECU 20 calculates a target path of the own vehicle based on the lane information at the present time point provided by the camera sensor 21. The target path is a path along which the own vehicle will move from the lane (the original lane) in which the own vehicle is traveling to the center location (hereinafter, referred to as a "final target lateral location") in a lane width direction of the adjacent lane (the target lane) corresponding to a lane change support request direction.

The driving support ECU 20 calculates a target steering angle for making the own vehicle travel along the target path, and transmits the steering instruction representing the calculated target angle to the EPS ECU 50, while the driving support ECU 20 is performing the lane change support control. The EPS ECU 50 controls the steering motor 52 such that the steering angle becomes (coincides with) the target steering angle. Thereby, the own vehicle can travel along the target path so that the lane change is performed. The driving support ECU 20 finishes the lane change support control when the driving support ECU 20 determines that the own vehicle reaches the final target lateral location based on the lane information at the present time point provided by the camera sensor 21. In addition, the driving support ECU 20 transmits the blinker flashing instruction to the meter ECU 30 so as to make some of the blinker lumps 31 corresponding to the lance change direction flash intermittently, while the driving support ECU 20 is performing the lane change support control.

The support controls performed by the driving support ECU 20 in the driving support system 1 have been described above. The support controls described above are mere examples. In some embodiments, the driving support ECU 20 performs a support control other than the above described support controls.

The driving support control performed by a "device other than the driving support ECU 20" will next be described. In the present embodiment, each of the right BSM module 11RR and the left BSM module 11RL performs a BSM control independently from each other.

The right BSM ECU 13RR is connected to a right indicator 16R. The left BSM ECU 13RL is connected to a left indicator 16L. The right indicator 16R is provided in a partial area on a mirror surface of a right side mirror. The left indicator 16L is provided in a partial area on a mirror surface of a left side mirror.

The right BSM ECU 13RR has stored a relative location of a right blind spot area with respect to the own vehicle, and the left BSM ECU 13RL has stored a relative location of a left blind spot area with respect to the own vehicle. The right blind spot area is set to include/cover an area which the right side mirror cannot reflect (an area which easily becomes a blind spot). The right blind spot area has been set to include/cover an area which the left side mirror cannot reflect (an area which easily becomes a blind spot). Each of the blind spot areas has a range in a vehicle left-right direction from "a location 0.5 meters away from a right side or a left side of a vehicle-body to outside of the vehicle-body" to "a location 3.5 meters away from the right side or the left side of the vehicle-body to outside of the vehicle-body", and a range in a vehicle front-rear direction from "a location 1 meter away from a rear end of the vehicle-body in a front direction" to "a location 4 meters away from the rear end of the vehicle-body in a rear direction".

Each of the right BSM ECU 13RR and the left BSM ECU 13RL performs the BSM control in a manner described below, while the ignition switch is in the on state. The right BSM ECU 13RR determines, based on the object information detected by the right rear side radar 12RR, whether or not a part or all of a vehicle body of the other vehicle is present/included in the right blind spot area. When the right BSM ECU 13RR determines that such an other vehicle is present in the right blind spot area, the right BSM ECU 13RR regards that other vehicle as the alert target vehicle. The left BSM ECU 13RL determines, based on the object information detected by the left rear side radar 12RL, whether or not a part or all of a vehicle body of the other vehicle is present/included in the left blind spot area. When the left BSM ECU 13RL determines that such an other vehicle is present in the left blind spot area, the left BSM ECU 13RL regards that the other vehicle as the alert target vehicle. In addition, the right BSM ECU 13RR determines, based on the object information detected by the right rear side radar 12RR, whether or not "an other vehicle which is predicted to enter the right blind spot area within a predetermined time period" is present. That is, the right BSM ECU 13RR determines whether or not an other vehicle which is approaching the own vehicle from the rear area of the own vehicle and is about to enter the right blind spot area is present. When the right BSM ECU 13RR determines that such an other vehicle is present, the right BSM ECU 13RR regards the other vehicle as the alert target vehicle. The right BSM ECU 13RR makes the determination as to whether that other vehicle is present, based on "the relative distance between the own vehicle and the other vehicle, the relative velocity of the other vehicle with respect to the other vehicle, and the direction of the other vehicle with respect to the own vehicle" detected by the rear side radar 12RR. The left BSM ECU 13RL determines, based on the object information detected by the left rear side radar 12RL, whether or not "an other vehicle which is predicted to enter the left blind spot area within the predetermined time period" is present. That is, the left BSM ECU 13RL determines whether or not an other vehicle which is approaching the own vehicle from the rear area of the own vehicle and is about to enter the left blind spot area is present. When the left BSM ECU 13RL determines that such an other vehicle is present, the left BSM ECU 13RL regards the other vehicle as the alert target vehicle. The left BSM ECU 13RL makes the determination as to whether that other vehicle is present, based on "the relative distance between the own vehicle and the other vehicle, the relative velocity of the other vehicle with respect to the other vehicle, and the direction of the other vehicle with respect to the own vehicle" detected by the rear side radar 12RL.

When the right BSM ECU 13RR finds the alert target vehicle, the right BSM ECU 13RR turns on the right indicator 16R. In this case, when the right blinker working signal is being transmitted to the global bus 100, the right BSM ECU 13RR flashes the right indicator 16R intermittently. When the left BSM ECU 13RL finds the alert target vehicle, the left BSM ECU 13RL turns on the left indicator 16L. In this case, when the left blinker working signal is being transmitted to the global bus 100, the left BSM ECU 13RL flashes the left indicator 16L intermittently. Therefore, when the driver performs a blinker operation in order to make the own vehicle turn in the direction of the area where the alert target vehicle is or will be present, a level of alerting the driver can be increased/enhanced.

The BSM control has been described in the above.

Figure 5:
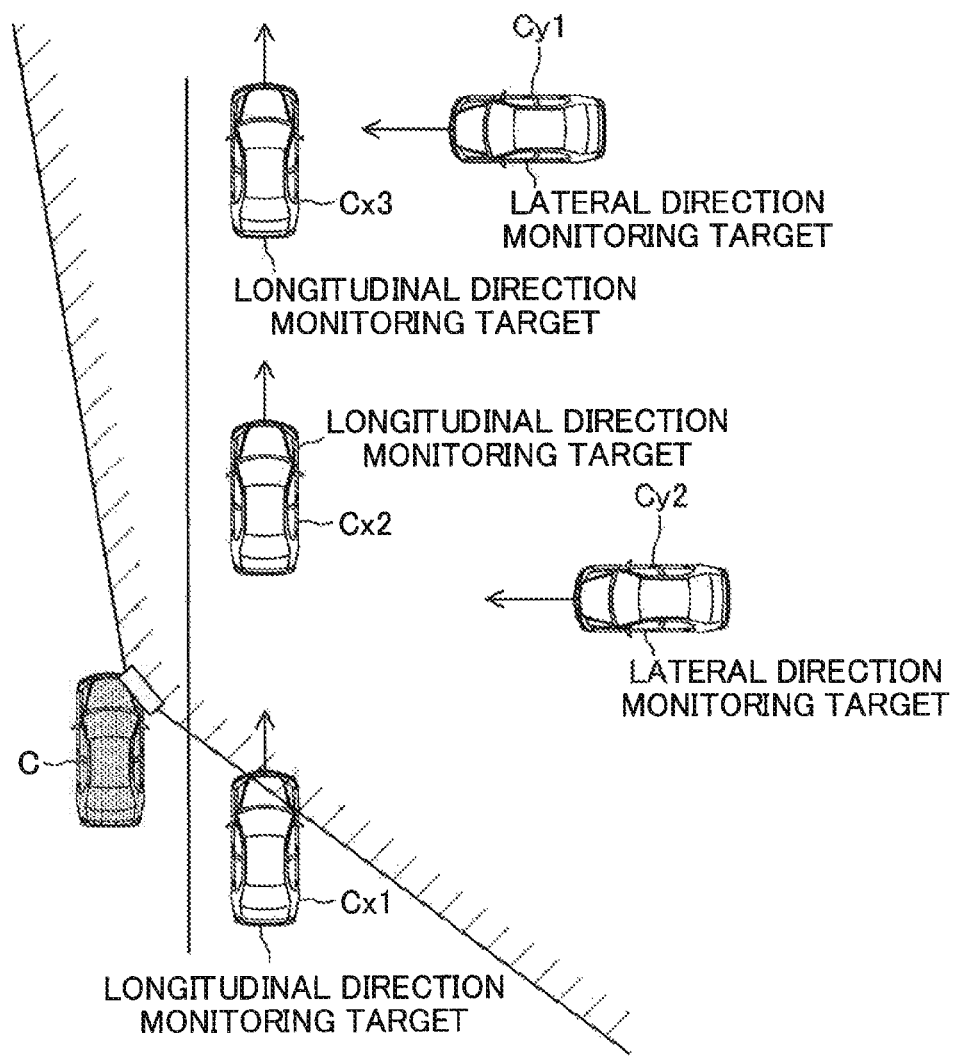
FIG. 5 is a plane diagram illustrating different monitoring targets according to driving support controls.

As described above, the driving support ECU 20 performs various types of the driving support controls based on the object information provided by the vehicle surrounding monitoring device 10. The moving objects to be monitored are not common to (or are different among) the driving support controls. For example, as shown in FIG. 5, in the front area cross alert control, the moving objects Cy1 and Cy2 which are approaching to the own vehicle in the lateral direction become the monitoring targets. Any one of the monitoring targets having the remaining time period Tx which becomes equal to shorter than the time threshold Tref is set to (treated as) the alert target.

Meanwhile, in the lane change support control, the moving objects Cx1, Cx2 and Cx3 which are traveling/moving in the target lane in the longitudinal direction become the monitoring target, regardless of whether or not the moving object is approaching the own vehicle. In this case, it is determined whether or not the lane change support allowance condition is satisfied based on the relative distance between the own vehicle and each of the moving objects Cx1, Cx2 and Cx3.

In the driving support system 1, it is desired that the vehicle surrounding monitoring device 10 selects the moving object which is to be the monitoring target according to each of the driving support controls among the objects detected by each of the radars 12, and provides the object information on the selected moving object to the driving support ECU 20. The driving support ECU 20 does not select one of the driving support controls to be performed among the driving support controls. That is, the driving support ECU 20 does not switch the driving support controls from one to another. Instead, the driving support ECU 20 performs the driving support controls simultaneously (at the same time). For example, the front area cross alert control is always performed, and therefore, the front area cross alert control and the lane change support control are performed at the same time when the lane change support control is performed.

In this case, if the vehicle surrounding monitoring device 10 selects, from among the objects detected by each of the radars 12, "the moving object which is the monitoring target in the front area cross alert control" and "the moving object which is the monitoring target in the lane change support control" separately, and provides the object information for the front area cross alert control and the object information for the lane change support control separately to the driving support ECU 20, the driving support ECU 20 can acquire the ideal object information. However, this approach increases processing amount for generating the object information, storing the object information, and transmitting the object information in each of the radar ECUs 13 of the vehicle surrounding monitoring device 10. Therefore, each of the radar ECUs 13 may not be able to respond to the request due to limitation of resources of the memory and the communication system. Further, it may be necessary to increase a capacity of the memory in the driving support ECU 20. Therefore, this approach increases a cost of the vehicle surrounding monitoring device 10 significantly. Furthermore, since a part of the object information for the front area cross alert control may be the same as a part of the object information for the lane change support control, the above approach is not preferable in terms of calculation efficiency, memory efficiency, and the like.

In view of the above, the vehicle surrounding monitoring device 10 according to the present embodiment provides, to the driving support ECU 20, the object information which enables each of the driving support controls to be performed (or which is required for performing each of the driving support controls) without significantly increasing the cost of the vehicle surrounding monitoring device 10. Each of the radar ECUs 13 selects from among the objects detected by the respective radars 12, the object (the monitoring target) which the driving support ECU 20 has to acquire in order to perform each of the driving support controls, and provides the object information on the selected object to the driving support ECU 20.

Figure 6:
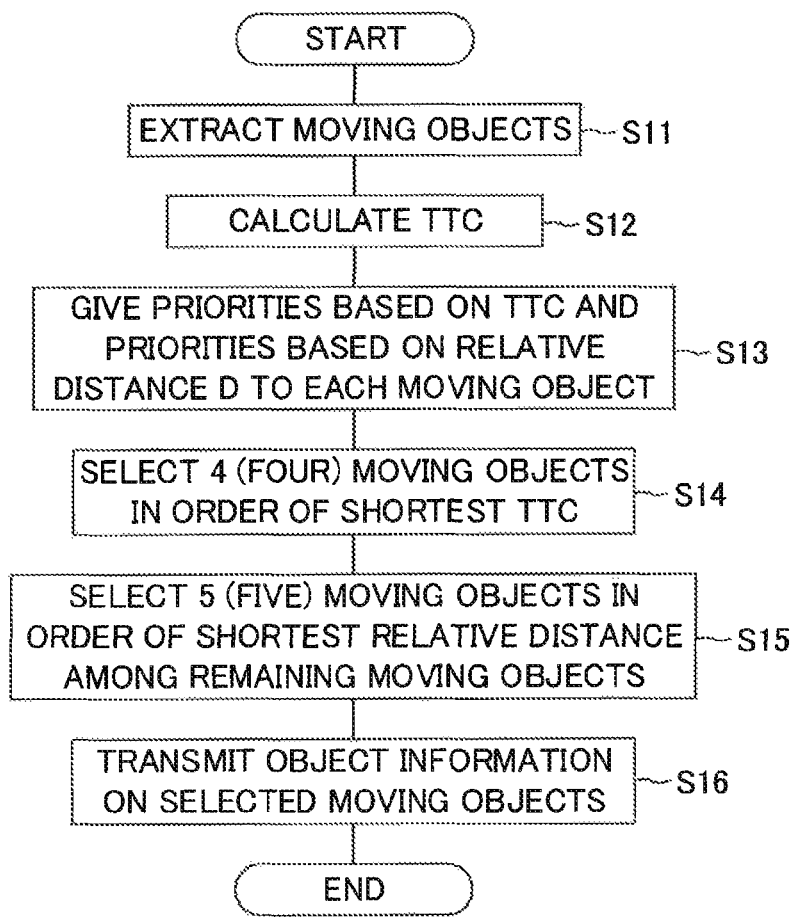
FIG. 6 is a flowchart illustrating a monitoring target selecting routine.

Hereinafter, a monitoring target selecting routine which is executed by each of the radar ECUs 13 (the right FSR ECU 13FR, the left FSR ECU 13FL, the right BSM ECU 13RR, and the left BSM ECU 13RL) will be described. The monitoring target selecting routine executed by each of the radar ECUs 13 is shown in FIG. 6. Each of the radar ECUs 13 continues executing the monitoring target selecting routine at predetermined interval (cycle) while the ignition switch is in the on state.

When the monitoring target selecting routine starts, each of the radar ECUs 13 acquires "the object information on the objects" provided by/from the respective radars 12 at Step S11, and extracts the moving object which is moving among the objects. In other words, each of the radar ECUs 13 extracts the object other than a stationary object(s).

Each of the radars 12 transmits, to the respective radar ECUs 13, a signal indicative of "the relative location (the relative distance and the relative direction) of the object with respect to the radar 12, the relative velocity of the object with respect to the radar 12, the size (width) of the object, the strength of the reflected waves from the object, and the like", as the object information, at the predetermined calculation interval (cycle). Each of the radar ECUs 13 acquires not only the object information but also the vehicle information provided by/from the vehicle state sensors 60. The vehicle information includes the vehicle velocity, the yaw rate, the acceleration, and the like. Each of the radar ECUs 13 extracts the moving object among the objects based on the acquired information. For example, when a motion state of the own vehicle is acquired, a time series change (transition) of the location of the stationary object detected by each of the radars 12 can be predicted. Therefore, each of the radar ECUs 13 can determine/regard, as the moving object, the object having a time series change of location which is different from the predicted time series change of the location of the stationary object.

Figure 7:
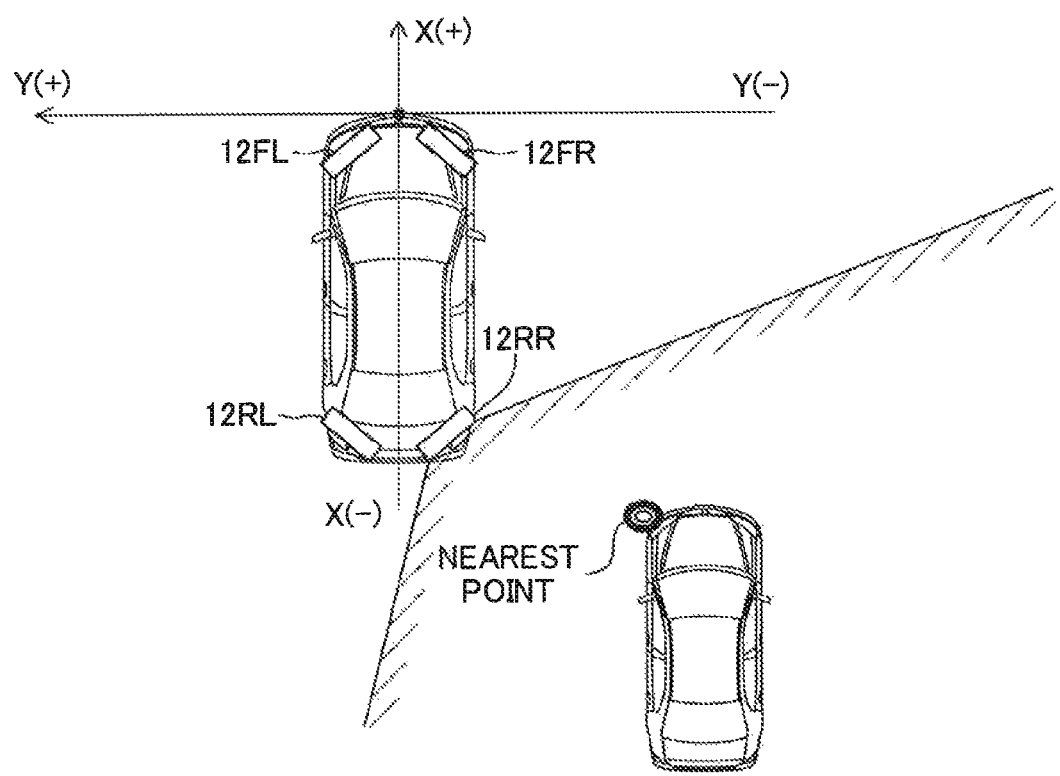
FIG. 7 is a plane diagram illustrating a coordinates of the moving object.

In the present embodiment, each of the radar ECUs 13 generates the object information including the location of the moving object. As shown in FIG. 7, the location of the moving object included in the object information is defined as a position of the nearest point of the moving object with respect to the center of each of the radars 12. This location of the moving object is expressed using XY coordinates with the center point in the left-right direction of a front end of the front bumper of the own vehicle as the origin (original point).

Subsequently, at step S12, each of the radar ECUs 13 calculates a predicted collision time TTC of the moving object (approaching object) which is approaching the own vehicle. The predicted collision time TTC is calculated using the following equation (1).

$$TTC=D/Vr \quad (1)$$

Figure 8:
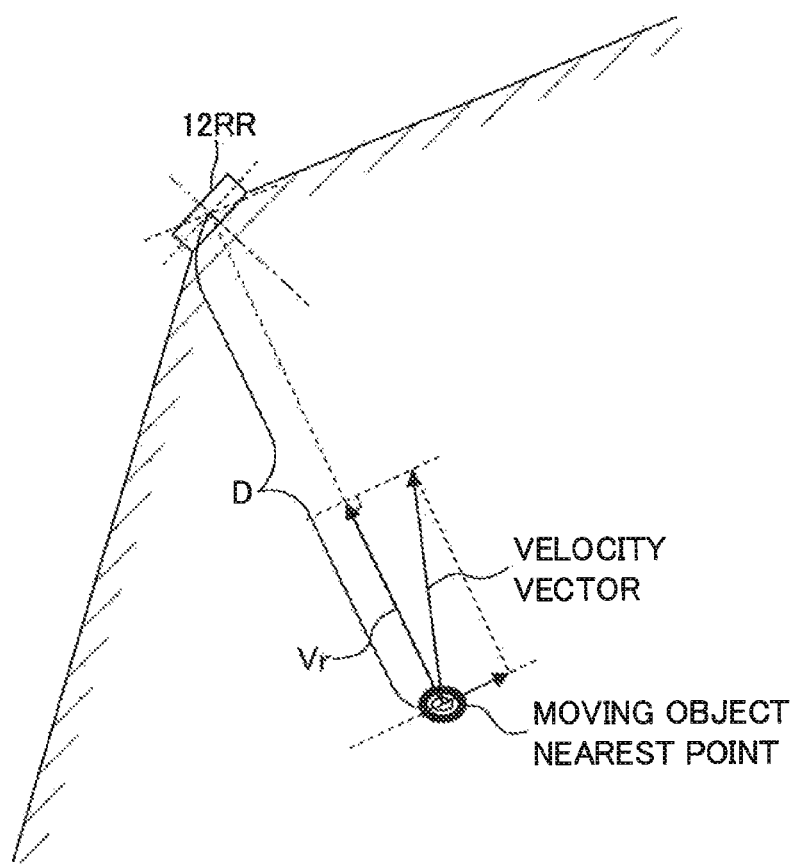
FIG. 8 is a plane diagram illustrating a predicted collision time.

In the equation (1), Vr is a relative velocity Vr of the location (the nearest point) of the moving object with respect to the center location of each of the radars 12, and D is a distance D (relative distance D) between the center location of each of the radars 12 and the location of the moving object (refer to FIG. 8). As shown in FIG. 8, the relative velocity Vr is a velocity obtained by decomposing a velocity vector of the moving object in a direction corresponding to a line segment connecting the center location of each of the radars 12 and the location (the nearest point) of the moving object. In other words, the relative velocity Vr is a "component along the line segment" of the velocity vector of the moving object. The relative velocity Vr is detected by the radar 12 and represents the relative velocity of the moving object with respect to the own vehicle. The relative distance D is detected by the radar 12 and represents the relative distance between the moving object and the own vehicle.

The predicted collision time TTC is calculated for each and every moving object approaching the own vehicle regardless of whether or not it is predicted that the moving object collide with the own vehicle. The relative velocity Vr becomes a positive value when a distance between the own vehicle and the moving object becomes shorter (that is, the mo moving object is approaching the own vehicle). Therefore, the predicted collision time TTC calculated at Step S12 is a positive value.

Subsequently, at Step S13, each of the radar ECUs 13 gives a "rank based on (associated with) the predicted collision time TTC" and a "rank based on (associated with) the relative distance D" to each of the extracted moving objects. As the predicted collision time TTC is shorter, the rank associated with the predicted collision time TTC is higher. As the relative distance D is shorter, the rank associated with the relative distance D is higher.

Subsequently, at Step S14, each of the radar ECUs 13 selects 4 (four) top ranking moving objects (approaching objects) regarding the predicted collision time TTC from among the extracted moving objects. At this time, each of the radar ECUs 13 gives priorities (1st priority through 4th priority) to the selected four moving objects, respectively, in ascending order of the predicted collision times TTC of the selected moving objects (in order of shortest TTC). That is, the highest (first) priority is given to the moving object having the shortest TTC. The second highest (second) priority lower than the highest (first) priority is given to the moving object having the second shortest TTC longer than the shortest TTC. The third highest (third) priority lower than the second highest priority is given to the moving object having the third shortest TTC longer than the second shortest TTC. The fourth highest (fourth) priority lower than the third highest priority is given to the moving object having the fourth shortest (i.e., longest) TTC longer than the third shortest TTC. Further, each of the radar ECUs 13 stores a relationship between a moving object ID which is information for identifying each of the selected four moving objects and the priority given to each of the selected four moving objects. When the number of the extracted moving object is smaller than 4 (four), all of the extracted moving objects are selected, and the priorities are given to the selected moving objects in ascending order of the predicted collision times TTC of the selected moving objects. This selecting number (4) is corresponding to a first predetermined number of the present disclosure. In some embodiments, this selecting number is any arbitrary and appropriate value.

A case may arise where a plurality of the moving objects with the same predicted collision times TTC are detected and a part of these moving objects cannot be selected as the 4 (four) top ranking moving objects regarding the predicted collision time TTC (in other words, the number of the selected moving objects becomes greater than "4" if the moving objects with the same predicted collision times TTC are included when selecting the four moving objects in ascending order of the predicted collision times TTC of the selected moving objects). In this case, each of the radar ECUs 13 selects the moving objects among these moving objects according to the following rule.

The moving object to which any of the four highest priorities (i.e., 1st priority through 4th priority) has been given for a last predetermined time period to (immediately before) the present time point is preferentially selected.

When a plurality of the moving objects with the same predicted collision times TTC are newly detected at the same time, the moving object is selected in ascending order of the relative distances D (in order of shortest D).

Subsequently, at Step S15, each of the radar ECUs 13 selects 5 (five) moving objects (5 (five) top ranking moving objects regarding the relative distance D) in ascending order of the relative distance D (in order of shortest D) from among the extracted moving objects except for the moving objects selected at Step S14. The moving object is selected at Step S15 regardless of whether or not the moving object is approaching the own vehicle. In other word, the selected 5 (five) moving objects may include a moving object which is moving away from the own vehicle. Each of the radar ECUs 13 gives priorities (5th priority through 9th priority) to the selected five moving objects in ascending order of the relative distances D (in order of shortest D) of the moving objects. That is, the fifth priority is given to the moving object having the shortest relative distance D. The sixth highest priority lower than the fifth priority is given to the moving object having the second shortest relative distance D longer than the shortest relative distance D. The seventh highest priority lower than the sixth highest priority is given to the moving object having the third shortest relative distance D longer than the second shortest relative distance D. The eighth highest priority lower than the seventh highest priority is given to the moving object having the fourth shortest relative distance D longer than the third shortest relative distance D. The ninth highest priority lower than the eighth highest priority is given to the moving object having the fifth shortest relative distance D longer than the fourth shortest relative distance D. Further, each of the radar ECUs 13 stores a relationship between a moving object ID which is information for identifying each of the selected five moving objects and the priority which is given to each of the selected moving objects. When the number of the extracted moving objects other than "the 4 (four) top ranking moving objects regarding the predicted collision time TTC (the 4 (four) moving objects selected in ascending order of the predicted collision time TTC") is smaller than "5", all of the extracted moving objects are selected, and the priorities are given to the selected moving objects (other than the 4 (four) top ranking moving objects to which the priorities have been already given) in ascending order of the relative distances D of the moving objects. This selecting number (5) is corresponding to a second predetermined number of the present disclosure. In some embodiments, this selecting number any arbitrary and appropriate value.

A case may arise where a plurality of the moving objects with the same relative distances D are detected and a part of these moving objects cannot be selected as the the 5 (five) top ranking moving objects regarding the relative distance D (in other words, the number of the selected moving objects becomes greater than "5" if the moving objects with the same relative distances D are included when selecting the five moving objects in ascending order of the relative distances D of the selected moving objects). In this case, each of the radar ECUs 13 selects the moving objects among these moving objects according to one of the following rules.

The moving object is preferentially selected in ascending order of the predicted collision time TTC.

The moving object is preferentially selected in descending order of the strength of the reflected waves which the radar receives.

One of the above two rules can be adopted. As the strength of the reflected waves is stronger, the accuracy of detection of the object is higher.

After the each of the radar ECUs 13 gives the priorities to the moving objects, each of the radar ECUs 13 provides, to the driving support ECU 20, the object information (the relative location, the relative velocity, the size, and the like, of the moving object) which is information on the moving objects with the first priority to ninth priority (i.e., priorities (1-9)) at step S16. At this time, each of the radar ECUs 13 performs a process for converting the object information transmitted from the respective radars 12 into object information which the driving support ECU 20 can use, through a process for generating the object information, a process for storing the object information, a process for communicating the object information, and the like.

After each of the radar ECUs 13 finishes the process of Step S16, each of the radar ECUs 13 tentatively terminates the monitoring target selecting routine, and repeatedly performs the monitoring target selecting routine at the predetermined calculation interval (cycle).

Figure 9:
FIG. 9 is an explanation diagram illustrating relationships between priorities and moving object IDs.

An example of the relationship between the priorities and the moving object IDs is shown in FIG. 9. The each of the radar ECUs 13 has a memory area M in which the moving object IDs corresponding to the first priority to ninth priority (i.e., priorities (1-9)) can be stored, and stores the moving object IDs corresponding to the first priority to ninth priority into the memory area M. In this example, the number of the moving objects among the objects detected by one of the radars 12 are "7". Therefore, nothing is stored in the moving object IDs corresponding to the 8th priority and the 9th priority (priorities "8" and "9") in the memory area M. Hereinafter, the first to ninth priority are expressed by priority "1" to "9", respectively.

The priorities "1" through "4" represent the priorities of the moving object (the monitoring target object) to be monitored by the driving support ECU 20 from a viewpoint (hereinafter, referred to as a "viewpoint 1") of preventing a collision accident. Meanwhile, the priorities "5" through "9" represent the priorities of the moving object (the monitoring target object) to be monitored by the driving support ECU 20 from a viewpoint (hereinafter, referred to as a "viewpoint 2") of performing the driving support through finding the space around the own vehicle. The viewpoint 1 is considered to be more important than the viewpoint 2. Therefore, the moving objects to be monitored from the viewpoint 1 are preferentially selected, and the moving objects to be monitored from the viewpoint 2 are selected in descending order of the priorities from the viewpoint 2 among the moving objects other than the moving object selected from the viewpoint 1. As a result, the moving objects selected from the viewpoint 1 may include the moving object with the high priority from the viewpoint 2.

The relationships (the relative location and the relative velocity) between the own vehicle and the moving object change every moment. Therefore, when the monitoring target selecting routine is repeatedly executed, the priorities of the moving objects change. The moving object which has been selected up to a certain time point may be not be selected at the certain time point. On the other hand, the moving object which has not been selected up to a certain time point may be selected at the certain time point. In this case, even if the priority of the moving object changes, the moving object ID of the moving object does not change. When the priority of the moving object changes, only a stored location of the moving object in the memory area M changes. Therefore, the each of the radar ECUs 13 can specify/track transition (time-series change) of the priority of each of the moving objects.

For example, any of the priority (1 through 4) based on the viewpoint 1 is not given to the 5th approaching object in ascending order of the predicted collision time TTC. However, when the relative distance D of that approaching object becomes shorter, any of the priority (5 through 9) based on the viewpoint 2 is given to that approaching object. Therefore, the object information on that approaching object is provided to the driving support ECU 20 at a time point at which the priority based on the viewpoint 2 is given to that approaching object. When a rank of an approaching object in ascending order of the predicted collision time TTC changes from 5th to 4th, the priority based on the viewpoint 1 is given to this approaching object. The driving support ECU 20 has stored the object information on this approaching object before this time point. The driving support ECU 20 can perform a process for predicting the traveling path of the moving object more accurately, as a time period for storing the object information on the moving object is longer. Therefore, the driving support ECU 20 can perform the driving support control more accurately.

The vehicle surrounding monitoring device 10 according to the present embodiment described above extracts the moving objects among the object detected by each of the radars 12. The vehicle surrounding monitoring device 10 selects 4 (four) moving objects in ascending order of the predicted collision time TTC among the extracted moving objects, and selects 5 (five) moving objects in ascending order of the relative distance D among the remaining extracted moving objects. The object information on the selected moving objects is provided to the driving support ECU 20.

Accordingly, the moving objects which has to be monitored by the driving support ECU 20 for performing the safety driving support control (for example, the front area cross alert control, the rear area cross alert control, and the like) can be selected certainty. In addition, the moving objects which has to be monitored by the driving support ECU 20 for performing the driving support control (for example, the lane change support control and the like) can be selected certainty.

In this case, each of the 5 (five) moving objects in ascending order of the relative distance D which are selected at Step S15 does not overlap with any of the 4 (four) moving objects in ascending order of the predicted collision time TTC which are selected at Step S14. Therefore, the vehicle surrounding monitoring device 10 can avoid performing the unnecessary processes of generating the duplicated object information, storing the duplicated object information, and transmitting the duplicated object information.

The moving objects are selected using the above described priority/order. Therefore, necessary information for each of the driving support controls can be secured, and a total information amount can be decreased.

As a result, according to the vehicle surrounding monitoring device 10, each of the radar ECUs 13 can provide the necessary object information (surrounding monitoring information) to the driving support ECU 20 within capacity of the limited resources (the memory of each of the radar ECUs 13 and the communication system by which each of the radar ECUs 13 transmits the object information to the driving support ECU 20). Thus, the appropriate object information can be provided without increasing the cost of the vehicle surrounding monitoring device 10.

In the case where the moving objects are selected based on the predicted collision time TTC, when the moving objects with the same predicted collision time TTC from each other are detected, the moving object with the shorter relative distance D is preferentially selected. Thus, the moving object can be selected more appropriately.

The vehicle surrounding monitoring device according to the present embodiment has been described above, however, the present disclosure is not limited to the above described embodiment, and can adopt various modifications of the present disclosure.

For example, in the present embodiment, both the front side radar 10F and the rear side radar 10R provide the object information on the moving objects which are selected through the monitoring target selecting routine. In some embodiments, either the front side radar 10F or the rear side radar 10R provides the object information on the moving objects which are selected through the monitoring target selecting routine.

In the front area cross alert control and the rear area cross alert control performed by the driving support ECU 20, the timing at which the alert is performed is determined based on the remaining time period Tx (=Dx/Vx). In some embodiments, this timing is determined based on the predicted collision time TTC (=D/Vr).

The driving support system to which the vehicle surrounding monitoring device is applied is not limited to the driving support system which performs the driving support control described in the present embodiment. For example, the present disclosure can be applied to a driving support system which performs an automatic driving control for detecting a space around the own vehicle to making the own vehicle enter the detected space automatically not only when the lane change request is received but also while the own vehicle is traveling.

In some embodiments, the driving support system to which the vehicle surrounding monitoring device is applied comprises a front area monitoring device for monitoring the front area of the own vehicle in addition to the vehicle surrounding monitoring device. The front area monitoring device monitors an obstacle which is present in the front area of the own vehicle to perform a collision safety control (an alert control and an automatic brake control) for preventing the own vehicle from colliding with the obstacle.

What is claimed is:

1. A vehicle surrounding monitoring device comprising:
an object detection electronic control unit (ECU); and
a driving support ECU configured to perform a safety driving support control and an operation driving support control, the vehicle surrounding monitoring device being installed in a vehicle, the safety driving support control being a control for alerting a driver when a probability of collision between the vehicle and a moving object which is approaching the vehicle becomes high, and the operation driving support control being a control for supporting an operation for making the vehicle move in a lateral direction, wherein the object detection ECU is configured to:
detect moving objects which are moving around the vehicle;
select, from among the detected moving objects, based on an ascending order of a predicted collision time of each of the detected moving objects, a predetermined number of first moving objects, wherein the predicted collision time is indicative of a predicted time that it takes for the moving object to collide with the vehicle;
select, from among the remaining detected moving objects other than the selected first moving objects, based on an ascending order of a relative distance of each of the remaining detected moving objects between the moving object and the vehicle, a predetermined number of second moving objects; and
send, to the driving support ECU, the selected first moving objects and the selected second moving objects.

2. The vehicle surrounding monitoring device according to claim 1, wherein the predicted collision time is a time period corresponding to a value obtained through dividing the relative distance between the moving object and the vehicle by a relative velocity of the moving object with respect to the vehicle.

3. The vehicle surrounding monitoring device according to claim 1, wherein the driving support ECU is further configured to:
perform an approaching alert control for alerting the driver when the probability of the collision between the vehicle and the moving object which is approaching a traveling path of the vehicle in such a manner that the moving object crosses the traveling path becomes high, as the safety driving support control; and
perform a lane change support control for controlling steering in such a manner that the vehicle changes lanes from a present lane in which the vehicle is traveling to an adjacent lane which is adjacent to the present lane, as the operation driving support control.

4. The vehicle surrounding monitoring device according to claim 1, wherein the objection detection ECU is configured to give a higher priority for the selection to the moving object with a shorter relative distance among the moving objects with a same predicted collision time.

5. The vehicle surrounding monitoring device according to claim 1, wherein the object detection ECU is configured to give a higher priority for the selection to the moving object with a shorter predicted time among the moving objects with a same relative distance.

\* \* \* \* \*